(12) United States Patent　　　　(10) Patent No.:　　US 12,631,817 B2
　　Boyd et al.　　　　　　　　　　 (45) Date of Patent:　　　May 19, 2026

(54) ORGANICALLY MODIFIED CHALCOGENIDE POLYMER PREFORMS AND FIBERS

(71) Applicant: The Government of the United States of America, as represented by the Secretary of the Navy, Arlington, VA (US)

(72) Inventors: Darryl A. Boyd, Fort Washington, MD (US); Vinh Q. Nguyen, Fairfax, VA (US); Daniel L. Rhonehouse, Chesapeake Beach, MD (US); Geoffrey D. Chin, Washington, DC (US); Frederic H. Kung, Alexandria, VA (US); Kenneth J. Ewing, Washington, DC (US); Daniel J. Gibson, Cheverly, MD (US); Woohong Kim, Lorton, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 227 days.

(21) Appl. No.: 18/596,603

(22) Filed: Mar. 5, 2024

(65) Prior Publication Data

US 2025/0012968 A1　　　Jan. 9, 2025

Related U.S. Application Data

(60) Provisional application No. 63/450,305, filed on Mar. 6, 2023.

(51) Int. Cl.
| | |
|---|---|
| *G02B 6/02* | (2006.01) |
| *B29D 11/00* | (2006.01) |
| *C03B 5/16* | (2006.01) |
| *C03C 3/32* | (2006.01) |
| *G02B 6/10* | (2006.01) |

(52) U.S. Cl.
CPC .... *G02B 6/02033* (2013.01); *B29D 11/00721* (2013.01); *C03B 5/16* (2013.01); *C03C 3/321* (2013.01); *G02B 6/02304* (2013.01); *G02B 6/102* (2013.01)

(58) Field of Classification Search
CPC ........... C03B 5/16; C03C 3/321; G02B 6/102; B29D 11/00721
See application file for complete search history.

(56) References Cited

U.S. PATENT DOCUMENTS

| | | | |
|---|---|---|---|
| 2016/0257593 A1* | 9/2016 | Nguyen | ................. C03B 25/00 |
| 2019/0194052 A1* | 6/2019 | Nguyen | ................. B32B 17/00 |

* cited by examiner

*Primary Examiner* — Eric Wong

(74) *Attorney, Agent, or Firm* — US Naval Research Laboratory; Rebecca L. Forman

(57) ABSTRACT

A method of making chalcogenide based polymeric materials and converting those materials into optical fiber preforms and polymeric optical fibers. The preforms and fibers comprise chalcogenide elements and crosslinking moieties. These fibers can be used as optical waveguides at infrared wavelengths where other polymer fibers do not operate. The optical waveguides are ideally suitable for applications requiring the transmission of low-power infrared light, but may also be useful for transmitting high-power light at visible or infrared wavelengths.

28 Claims, 3 Drawing Sheets

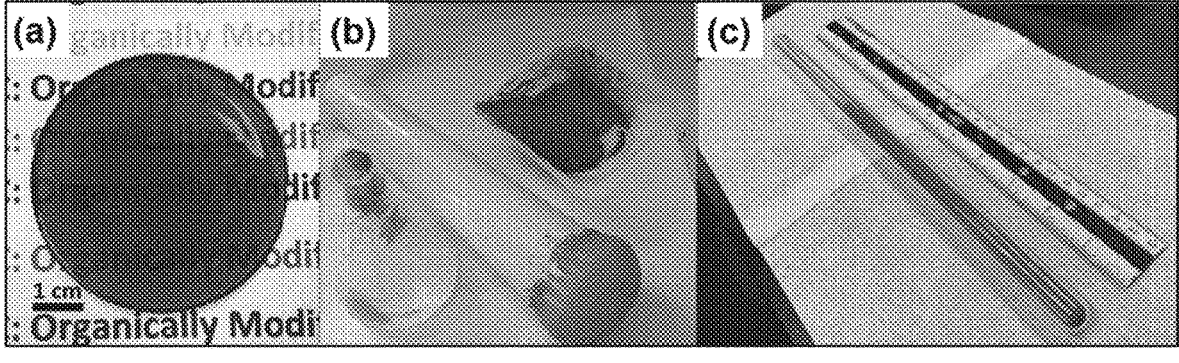
FIG. 1A          FIG. 1B                    FIG. 1C
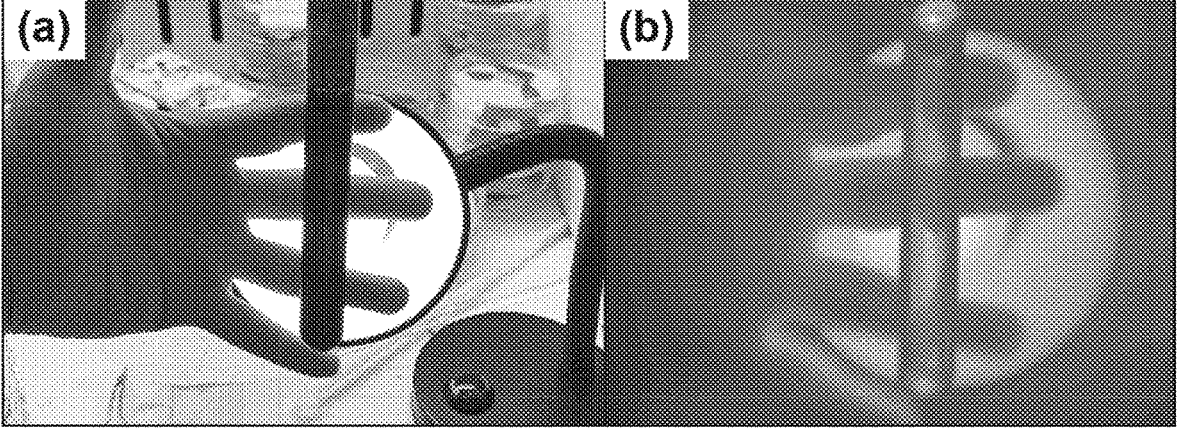
FIG. 2A                              FIG. 2B

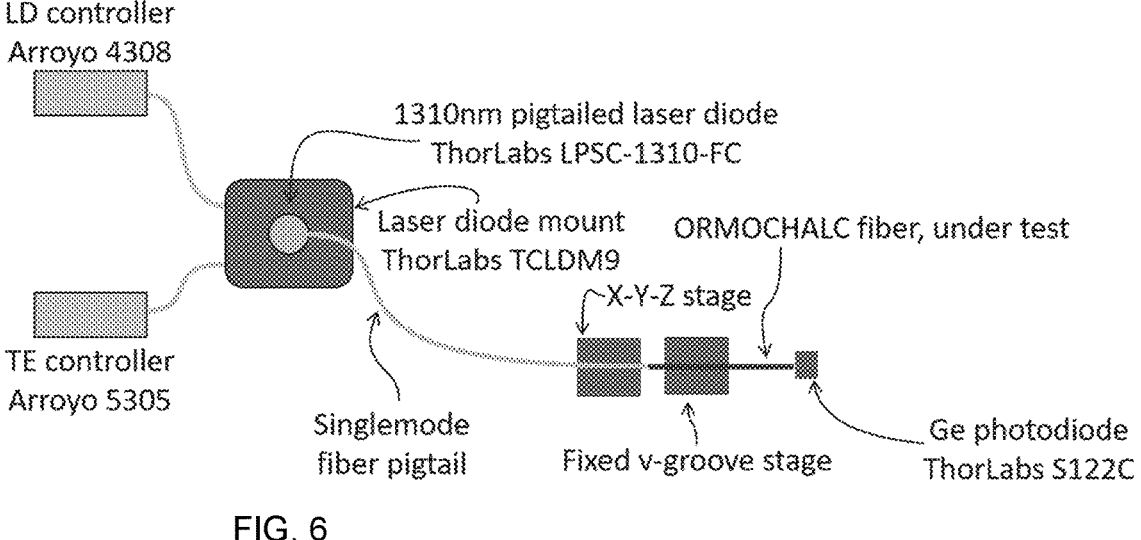
FIG. 6
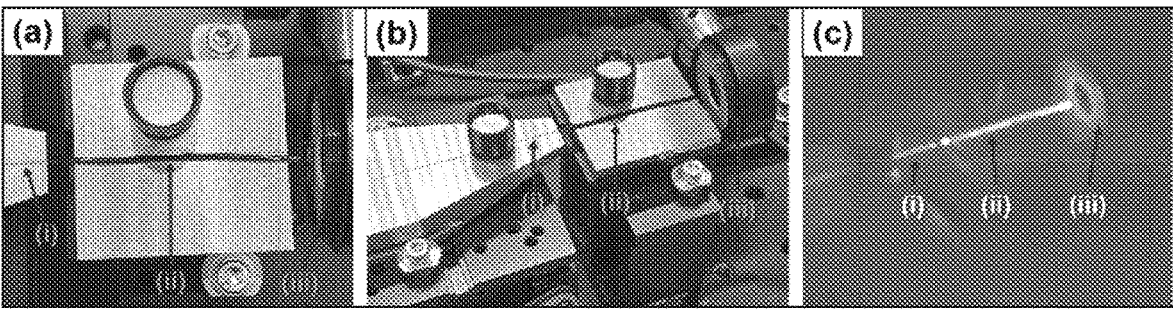
FIG. 7A
FIG. 7B
FIG. 7C

ORGANICALLY MODIFIED CHALCOGENIDE POLYMER PREFORMS AND FIBERS

CROSS-REFERENCE

This application is a nonprovisional application and claims the benefit of U.S. Provisional Application Ser. No. 63/450,305, filed Mar. 6, 2023, entitled "ORGANICALLY MODIFIED CHALCOGENIDE POLYMER PREFORMS AND FIBERS," by Darryl A. Boyd, et al. This provisional application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; nrltechtran@us.navy.mil, referencing Navy Case #211455-US2.

TECHNICAL FIELD

The present invention relates to optical preforms and fibers made from chalcogenide based polymeric materials.

BACKGROUND

Fibers that can guide light are valuable tools for numerous applications, including telecommunications, remoting of optical components, sensing and others. Specifically, optical waveguides are necessary components in integrated optical circuits, as well as in long distance optical communications. Although polymer-based optical waveguides are common, they typically do not function in the infrared (IR) region of the electromagnetic spectrum, which is required for many applications including chemical sensing and remoting of infrared optical components. Infrared waveguiding is typically accessed by utilizing chalcogenide glass materials (e.g. arsenic sulfide) or heavy-metal halide glass materials (e.g. indium fluoride). Optical fibers are commonly produced by stretching or drawing a fiber optic preform that is heated on a fiber optic draw tower. Glass fiber optic preforms are typically formed by chemical vapor deposition and consolidation of high purity soot (e.g. silica glass) or distillation and melting (e.g. chalcogenide glass) while polymer fiber preforms often consist of solid rod-in-tube or liquid reactants inside a solid tube. Some polymer fibers may also be extruded or drawn from liquid precursors or molten polymer. The disclosed invention details the fabrication and use of chalcogenide-based, inorganic-organic polymers as optical waveguides, which decreases costs (75% savings) and fabrication time and reduces weight (by 50% or more) in comparison to glass-based IR optical waveguides. The chalcogenide-based polymer waveguides of this invention enable transmission over a broad spectral range of light from the visible into the very long-wavelength infrared (VLWIR) region of the electromagnetic spectrum (400 nm-25 μm). They also possess tailorable high refractive indices (n>1.7) which makes them particularly suitable for numerous optical applications, and specifically for use as fiber optical waveguides for sensing, signal transmission and other uses. Finally, important properties, such as the refractive indices of different core/cladding transverse cross-sectional regions of a chalcogenide/polymer optical fiber may be tailored by modification of the composition of the polymer (e.g. ratio of crosslinking moiety/chalcogen, and species or mixture of chalcogen elements) to create appropriate refractive index profiles as needed for application-specific waveguide and fiber architectures. Examples include creating a waveguide supporting a specific number of optical modes and having a specific numerical aperture.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention relates to the process of making chalcogenide-based polymeric materials, and the conversion of those materials into optical fiber preforms and subsequently into novel polymeric optical fibers. Furthermore, this invention demonstrates the ability of these fibers to be used as optical waveguides at infrared wavelengths, where other polymer fibers do not operate. The material comprising the preforms and fibers are comprised of chalcogenide elements, such as sulfur and selenium, along with organic and/or inorganic crosslinking moieties. This class of materials is also referred to as organically-modified chalcogenides, and is often shortened to ORMOCHALC (Boyd et al., "ORMOCHALCs: Organically Modified Chalcogenide Polymers For Infrared Optics," *Chemical Communications,* 2017, 53, 259-262). The optical fiber of the present invention may contain a single chalcogenide-based polymeric cladding layer or multiple chalcogenide-based polymeric cladding layers with varying refractive indices surrounding a chalcogenide-based polymeric core fiber material, with a different refractive index, to form cladded or multi-clad optical waveguides. Alternatively, the optical fiber of the present invention may contain a chalcogenide-based polymeric core without a separate cladding. The ORMOCHALC optical waveguides are ideally suitable for applications requiring the transmission of low-power infrared light, but may also be useful for transmitting high-power light at visible or infrared wavelengths. The properties of these fibers (e.g. refractive index) can be controlled through chemistry and processing (e.g. by exploiting species and concentration of both the inorganic and organic components).

There are several advantages and new features provided by the present invention. It provides a chalcogenide-based polymeric optical fiber possessing infrared transmission capability that extends beyond the transmission capability of common polymeric optical fibers. It provides chalcogenide-based polymeric fiber optic preforms. It provides a method for the fabrication of chalcogenide-based polymeric optical fiber preforms. It provides a method for the drawing of chalcogenide-based polymeric optical fibers from a chalcogenide-based polymeric fiber optic preform. It provides a material and method to guide light. It utilizes the material for use as an optical waveguide that functions from the visible into the long wavelength infrared (LWIR). Chalcogenide-based polymeric optical fibers of the invention can transmit further into the infrared than common, organic-based polymer fibers, are less costly to fabricate and lighter weight compared to infrared glass fibers.

BRIEF DESCRIPTION OF THE DRAWINGS

FIG. 1A depicts a freestanding ORMOCHALC polymer. FIG. 1B depicts finely-ground ORMOCHALC polymer powder. FIG. 1C depicts ORMOCHALC powder packed into an ampoule prior to heating under vacuum.

FIG. 2A depicts an ORMOCHALC polymer preform inside an ampoule viewed in visible light conditions using a visible light camera. FIG. 2B depicts an ORMOCHALC polymer preform viewed through a short-wave infrared (SWIR) camera.

FIG. 6 depicts an ORMOCHALC fiber waveguiding measurement test configuration.

FIGS. 7A-7C depict demonstration of infrared light transmission through an ORMOCHALC polymer fiber. FIG. 7A depicts a top-down view. FIG. 7B depicts a side-angled view. FIG. 7C depicts a side-angled view observed using a SWIR camera. In FIGS. 7A-7C, the labels represent (i) silica fiber used for injection of infrared light, (ii) ORMOCHALC fiber, and (iii) the photodetector, respectively.

DETAILED DESCRIPTION

Figure 3:
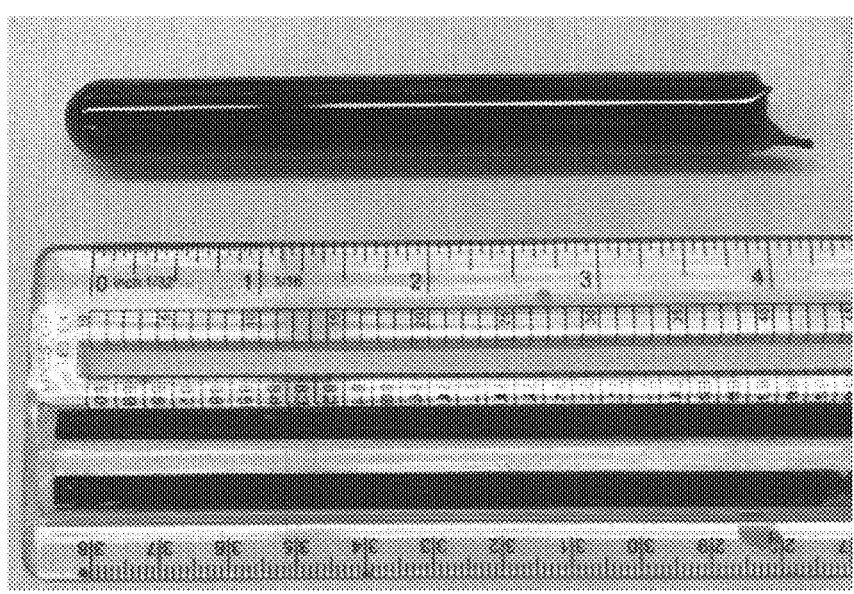
FIG. 3 depicts an ORMOCHALC polymer preform rod after removal from a silica ampoule.
Figure 4:
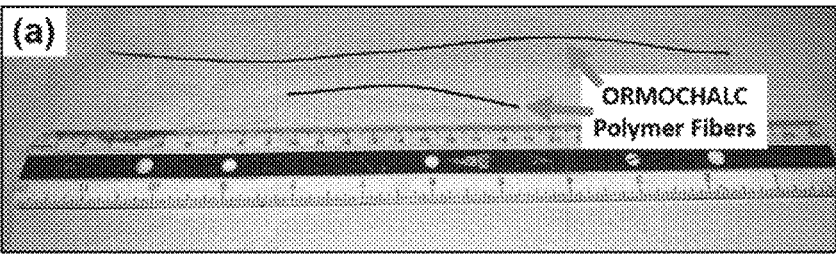
FIG. 4 depicts ORMOCHALC polymer fibers drawn from a preform rod.
Figures 5A, 5B, 5C, 5D:
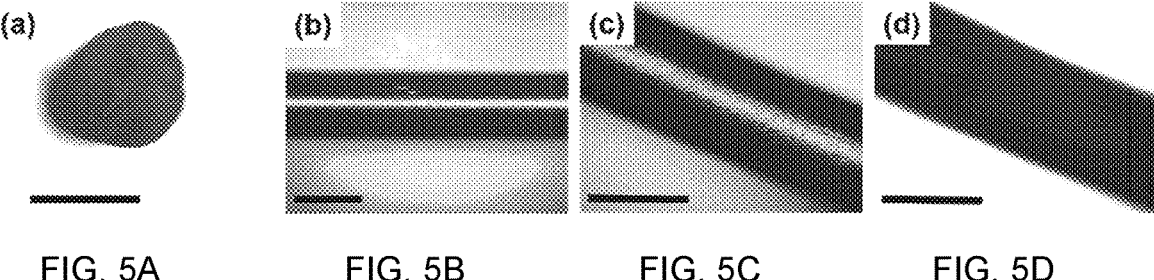
FIG. 5A depicts a magnified image of a cleaved ORMOCHALC polymer fiber end-face.
FIGS. 5B and 5C depict a magnified image of a fiber surface.
FIG. 5D depicts a magnified image of a backlit fiber image. The scale bars in FIGS. 5A-5D equal 1 mm.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention fills a technology void for polymer-based optical fibers that can guide light at visible and infrared (IR) wavelengths. These new low-cost fibers enable critical defense and commercial applications including telecommunications and sensing. The method of present invention prepares preform rods and waveguiding fibers that transmit multi-band, visible through IR light and that are light weight, low cost, and with a quick processing time. The refractive index is tunable for index-matching and controlling waveguiding performance (e.g. numerical aperture and number of guided modes). According to the method of the present invention, ORMOCHALC material is fabricated and then crushed into a powder or chunks. The crushed ORMOCHALC is placed in an ampoule. A vacuum is applied to the ampoule, and the ampoule is heated for several hours at temperatures suitable for the reagents utilized. Then the temperature is increased to a temperature suitable for the reagents utilized, and held for 5-10 hours. The ampoule is then returned to room temperature, the vacuum is removed, and the preform is removed from the ampoule. ORMOCHALC fibers are then drawn from the ORMOCHALC preform rods. The fiber diameter is controlled with temperature, preform feed rate, and fiber draw rate. The ORMOCHALC fiber demonstrates waveguiding and transmission of infrared light.

Chalcogenide Polymer Synthesis

In a preferred embodiment, polycrystalline sulfur powder is purified by a distillation process (Boyd et al., "ORMOCHALCs: Organically Modified Chalcogenide Polymers For Infrared Optics," *Chemical Communications,* 2017, 53, 259-262). The purified solid polycrystalline sulfur (Ss) is placed in a suitable container (e.g. non-stick, or glass ampoule) and heated to between 11° and 145° C., melting it to form a yellow liquid. A suitable comonomer such as 1,3-diisopropenyl benzene (referred to as DIB), is added to the molten sulfur (0.69 mol DIB per 1 mol $S_8$) at a temperature between 11° and 200° C. and mechanically stirred for a time between 3-25 minutes in the container. The container is then placed in a furnace, preheated to a temperature between 125 and 220° C., where it reacts to form a polymer over a period of time between 20 minutes and 24 hours. The container is then removed from the furnace to allow the polymer material to cool and be extracted in freestanding form. (FIG. 1A). This fabrication methodology is also used to produce polymer materials containing different ratios and species of chalcogen elements including sulfur, selenium, and sulfur/selenium mixtures at suitable processing temperatures and times. Other methods of synthesizing the chalcogenide polymer material may also be used.

Chalcogenide Polymer Preform Fabrication

Like other alternative optical fibers, ORMOCHALC fiber is drawn from a preform, but in this invention, the preform is produced by melting purified and finely ground ORMOCHALC polymer material in a suitable mold. The polymer material from the previous step is crushed and ground into chunks or a fine powder (FIG. 1B) with a preferred particle size range of 10 μm to 100 μm, although the particle size may be larger or smaller, to ensure sufficient mixing and homogeneity. The powder is introduced into a quartz ampoule/mold (FIG. 1C), although the mold may be made of any other material non-reactive to the contents. The ampoule is placed vertically inside a vertical tube furnace and connected to a mechanical vacuum pump using suitable fixtures and vacuum evacuated to ~2.5×10⁻¹ Torr and held for 30 minutes at a temperature suitable for the reagents utilized. Next, the furnace temperature is increased to an appropriate temperature for the reagents (e.g. between 11° and 115° C.) and held at this temperature, under vacuum, for a suitable time between 3 and 5 hours. The furnace temperature is then increased to a preferred temperature (e.g. between 15° and 155° C.), under vacuum, for a preferred time between 5 and 10 hours to remove any potential bubbles. The furnace temperature is reduced to room temperature and the ampoule is then allowed to cool, while still under vacuum. Once cooled to room temperature, the vacuum is turned off/disconnected and a solid ORMOCHALC polymer rod, also called an ORMOCHALC preform, may be recovered from the ampoule/mold (FIG. 2A). The ORMOCHALC preforms of this method are solid, free of visible bubbles and demonstrate transparency in the visible and short-wavelength infrared spectral region (FIG. 2B). This fabrication methodology is also used to produce preforms from polymers containing different ratios and species of chalcogen elements including sulfur, selenium, and sulfur/selenium mixtures at suitable processing temperatures, pressures and times. Alternatively, the preform can be produced from coarse pieces of purified material or directly cast from precursors. For core/clad and multi-clad fibers, ORMOCHALC claddings may be fabricated at the preform step by rotating the mold as it cools to form an ORMOCH-ALC cladding tube that may subsequently receive the ORMOCHALC preform rod to form a core/clad preform. Alternatively, the tubes may be extruded from purified ORMOCHALC material.

Chalcogenide Polymer Fiber Fabrication

Optical fibers that are produced from preforms (e.g. silica, fluoride and chalcogenide glasses, some polymers) are typically drawn on a fiber optic draw tower. The ORMOCHALC polymer preform rod of this invention is solid and mechanically stable (FIG. 3) and may be drawn into fiber using a fiber optic draw tower. The ends of the preform are first attached to suitable extension rods using heat shrink tubing but may be secured using other means. The preform is then hung vertically in a nitrogen-purged low temperature fiber drawing furnace on a fiber optic draw tower, but other inert or reactive gasses may be used. ORMOCHALC polymer fiber is fabricated through the traditional draw process where the preform is heated and pulled at a preferred draw temperature between 6° and 225° C. using an in-line belt tractor puller, or other suitable means. As shown in FIGS. 4 and 5A-5D, continuous lengths of 1.5-2 m of uncoated ORMOCHALC fiber with a diameter of approximately 1 mm were collected in reduction to practice demonstration of this invention. Continuous lengths of ORMOCHALC fiber were also drawn and coated in-line with a UV curable acrylate cladding with total diameter ranging between 300-600 μm. Both cladded and uncladded ORMOCHALC fibers exhibited flexible and durable mechanical behavior. This fabrication methodology is also used to produce ORMOCH-ALC fibers from polymer preforms containing different ratios and species of chalcogen elements including sulfur, selenium, and sulfur/selenium mixtures at suitable processing temperatures.

Chalcogenide Polymer Fiber Waveguiding

A test apparatus was devised and prepared in order to test the waveguiding ability of the ORMOCHALC optical fiber by measuring the optical power transmitted by a length of ORMOCHALC fiber (FIG. 6). A 40 mm length of ORMOCHALC optical fiber was placed on a staging table. A photodetector was placed adjacent to the distal end of the fiber (FIGS. 7A-7C). Light from a 1310 nm laser diode light source was injected into the proximal end of the ORMOCH-ALC optical fiber via a segment of conventional single-mode silica optical fiber. The endfaces of the ORMOCH-ALC fiber were cleaved (not polished) for the demonstration and the fiber end face surface is not as flat or smooth as common with cleaved glass optical fibers, nor were the end faces coated with anti-reflection coatings to improve light transmission. In this reduction to practice demonstration, 41 mW of 1310 nm light entered the ORMOCHALC fiber and 11 mW was recorded exiting the fiber. This is the first demonstration of waveguiding of infrared light in an ORMOCHALC polymer fiber, and transmission may be improved with improved endface preparation and optimization of the waveguide.

Alternatives

There are many different possible embodiments for this invention. Selenium, tellurium, or both may also be used in any percentage combination, with or without sulfur. Other non-chalcogen elements, such as germanium, antimony, or tin, may also be used in any percentage combination with chalcogen elements. Comonomers other than DIB (such as divinyl benzene, tetravinyltin, or a combination thereof) may also be used in the fabrication process as comonomers.

Mixtures of comonomers may also be used in the fabrication process. The reaction temperature may vary. The reaction time may vary. The fiber draw temperature may vary. The product cure time may vary. Non-thermal methods of curing may be employed to cure the preform (e.g. UV irradiation, laser energy, or their combination). Non-thermal methods of curing may be employed to cure the fiber (e.g. UV irradiation, laser energy, or their combination). The ratio of chalcogen to comonomer may vary. Other methods to remove preform from glass ampoule/mold may be employed (e.g. breaking ampoule/mold).

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A method of making an organically modified chalcogenide polymer fiber optic preform, comprising
    making an organically modified chalcogenide polymer by melting a chalcogen powder, adding a comonomer to the melted chalcogen, heating the comonomer and melted chalcogen mixture, and cooling the resulting organically modified chalcogenide polymer;
    crushing the organically modified chalcogenide polymer into a powder or chunks;
    placing the crushed organically modified chalcogenide polymer into an ampoule;
    placing the ampoule inside a furnace;
    placing the ampoule under a vacuum;
    heating the ampoule to an initial temperature;
    increasing the temperature of the ampoule to a second temperature and holding at the second temperature for 5-10 hours;
    cooling the ampoule and disconnecting the vacuum; and
    recovering an organically modified chalcogenide polymer preform from the ampoule that is free of visible bubbles and transparent in the visible and infrared spectral region.

2. The method of claim 1, wherein the chalcogen powder comprises sulfur, selenium, or a combination thereof.

3. The method of claim 1, wherein the chalcogen powder comprises selenium, tellurium, or a combination thereof.

4. The method of claim 1, wherein the chalcogen powder comprises sulfur, selenium, tellurium, or a combination thereof.

5. The method of claim 1, wherein the chalcogen powder is combined with tin, antimony, germanium, or any combination thereof.

6. The method of claim 1, wherein the comonomer comprises 1,3-diisopropenyl benzene.

7. The method of claim 1, wherein the comonomer comprises divinyl benzene, tetravinyltin, or a combination thereof.

8. The method of claim 1, wherein the mole ratio of chalcogen powder to comonomer is 1:0.69.

9. The method of claim 1, wherein the initial temperature is between 11° and 115° C.

10. The method of claim 1, wherein the ampoule is held at the initial temperature between 3 and 5 hours.

11. The method of claim 1, wherein the second temperature is between 15° and 155° C.

12. An organically modified chalcogenide polymer optical fiber drawn from the organically modified chalcogenide polymer preform made by the method of claim 1.

13. The organically modified chalcogenide polymer optical fiber of claim 12, wherein the organically modified chalcogenide polymer optical fiber is used as an optical waveguide of infrared light.

14. The organically modified chalcogenide polymer optical fiber of claim 12, wherein the organically modified chalcogenide polymer optical fiber is used as an optical waveguide.

15. A method of making an organically modified chalcogenide polymer fiber optic preform, comprising placing into an ampoule either (a) pieces of an organically modified chalcogenide polymer material or (b) precursor materials comprising a chalcogen powder and a comonomer;

placing the ampoule inside a furnace;

heating the ampoule under vacuum;

increasing the temperature and holding at the increased temperature under vacuum for 5-10 hours;

cooling the ampoule and disconnecting the vacuum; and recovering an organically modified chalcogenide polymer preform from the ampoule that is free of visible bubbles and transparent in the visible and infrared spectral region.

16. The method of claim 15, wherein the organically modified chalcogenide polymer material or the chalcogen powder comprises sulfur, selenium, or a combination thereof.

17. The method of claim 15, wherein the organically modified chalcogenide polymer material or the chalcogen powder comprises selenium, tellurium, or a combination thereof.

18. The method of claim 15, wherein the organically modified chalcogenide polymer material or the chalcogen powder comprises sulfur, selenium, tellurium, or a combination thereof.

19. The method of claim 15, wherein the organically modified chalcogenide polymer material or chalcogen powder comprises at least one chalcogen combined with tin, antimony, germanium, or any combination thereof.

20. The method of claim 15, wherein the comonomer comprises 1,3-diisopropenyl benzene.

21. The method of claim 15, wherein the comonomer comprises divinyl benzene, tetravinyltin, or a combination thereof.

22. The method of claim 15, wherein the mole ratio of chalcogen powder to comonomer is 1:0.69.

23. The method of claim 15, wherein the initial temperature is between 11° and 115° C.

24. The method of claim 15, wherein the ampoule is held at the initial temperature between 3 and 5 hours.

25. The method of claim 15, wherein the second temperature is between 15° and 155° C.

26. An organically modified chalcogenide polymer optical fiber drawn from the organically modified chalcogenide polymer preform made by the method of claim 15.

27. The organically modified chalcogenide polymer optical fiber of claim 26, wherein the organically modified chalcogenide polymer optical fiber is used as an optical waveguide of infrared light.

28. The organically modified chalcogenide polymer optical fiber of claim 26, wherein the organically modified chalcogenide polymer optical fiber is used as an optical waveguide.

* * * * *